(12) United States Patent
Helfer

(10) Patent No.: US 8,096,526 B2
(45) Date of Patent: Jan. 17, 2012

(54) ROTARY ACTUATOR LEVER APPARATUS HAVING AN ANNULAR RECESS

(75) Inventor: Wade Jonathon Helfer, Ames, IA (US)

(73) Assignee: Fisher Controls International, LLC, Marshalltown, IA (US)

( * ) Notice: Subject to any disclaimer, the term of this patent is extended or adjusted under 35 U.S.C. 154(b) by 535 days.

(21) Appl. No.: 12/263,001

(22) Filed: Oct. 31, 2008

(65) Prior Publication Data

US 2010/0108929 A1 May 6, 2010

(51) Int. Cl.
*F16K 31/44* (2006.01)
(52) U.S. Cl. .................... 251/242; 251/231; 251/292
(58) Field of Classification Search .............. 251/61, 251/61.4, 231, 235, 242, 243, 291, 292
See application file for complete search history.

(56) References Cited

U.S. PATENT DOCUMENTS

| | | | |
|---|---|---|---|
| 1,990,990 A | 2/1935 | Hathorn | |
| 2,144,305 A | 1/1939 | Brisbane | |
| 2,380,952 A | 8/1945 | Dewey | |
| 2,441,624 A | 5/1948 | Elliott | |
| 2,683,992 A | 7/1954 | Price | |
| 3,452,961 A * | 7/1969 | Forsman | 251/31 |
| 3,517,953 A | 6/1970 | Wright et al. | |
| 3,541,871 A | 11/1970 | Burrell | |
| 3,727,837 A * | 4/1973 | Gazzera et al. | 236/87 |
| 3,985,151 A * | 10/1976 | Smith | 137/269 |
| 3,990,550 A | 11/1976 | Recker | |
| 4,006,993 A | 2/1977 | Woerlee | |
| 4,345,850 A | 8/1982 | Baumann | |
| 4,777,841 A | 10/1988 | Kitchen | |
| 4,790,218 A | 12/1988 | Cabrera | |
| 4,961,443 A | 10/1990 | Buccicone et al. | |
| 5,346,172 A * | 9/1994 | Gonsior | 251/58 |
| 5,887,608 A | 3/1999 | Bordelon et al. | |
| 5,924,671 A * | 7/1999 | Baumann | 251/62 |
| 5,988,205 A | 11/1999 | Eggleston | |
| 7,661,650 B2 * | 2/2010 | Dalluge et al. | 251/58 |
| 2005/0274416 A1 | 12/2005 | Engle et al. | |

(Continued)

FOREIGN PATENT DOCUMENTS

GB 2136541 9/1984
(Continued)

OTHER PUBLICATIONS

Emerson Process Management, "Product Bulletin for Type 1051 and 1052 Diaphragm Rotary Actuators," published May 2007, 12 pages.

(Continued)

*Primary Examiner* — John Fristoe, Jr.
(74) *Attorney, Agent, or Firm* — Hanley, Flight & Zimmerman, LLC

(57) ABSTRACT

Rotary actuator lever apparatus having an annular recess are described. An example rotary actuator lever includes a cylindrical body that has a first opening and a second opening axially aligned with the first opening, and sized larger than the first opening. The lever arm extends a predetermined distance from the body and has a first arm member spaced from a second arm member. Each of the first and second arm members includes an aperture to receive a fastener to operatively couple the lever to a stem of an actuator. The body includes an annular recess adjacent the first arm member of the lever arm to enable the first arm member to flex relative to the second arm member when the lever couples to the actuator stem.

22 Claims, 5 Drawing Sheets

U.S. PATENT DOCUMENTS

| | | |
|---|---|---|
| 2008/0202263 A1 | 8/2008 | Holtgraver |
| 2009/0114867 A1 | 5/2009 | Miller et al. |

FOREIGN PATENT DOCUMENTS

| | | |
|---|---|---|
| WO | 9849481 | 11/1998 |

OTHER PUBLICATIONS

Emerson Process Management, "Instruction Manual for Type 1051 and 1052 Size 33 Diaphragm Rotary Actuators," published Feb. 2008, 28 pages.

International Searching Authority, "International Search Report," issued in connection with international application No. PCT/US2009/057877, mailed Dec. 28, 2009, 4 pages.

International Searching Authority, "Written Opinion of the International Searching Authority," issued in connection with international application serial No. PCT/US2009/057877, mailed Dec. 28, 2009, 5 pages.

United States Patent and Trademark Office, "Non-Final Office Action," issued in connection with U.S. Appl. No. 11/936,561, mailed Apr. 27, 2011, 28 pages.

International Searching Authority, "International Search Report," issued in connection with international application serial No. PCT/US2008/081547, mailed Feb. 18, 2009, 4 pages.

International Searching Authority, "Written Opinion of the International Searching Authority," issued in connection with international application serial No. PCT/US2008/081547, mailed Feb. 18, 2009, 6 pages.

Fisher Controls International, LLC, "Type 1051 and 1052 Style F and G Size 40, 60, and 70 Rotary Actuators," Instruction Manual, Published Jun. 2007, 32 pages.

International Bureau, "International Preliminary Report on Patentability," issued in connection with counterpart international application serial No. PCT/US2009/057877, issued May 3, 2011, 6 pages.

\* cited by examiner

ID OF THE DISCLOSURE

This disclosure relates generally to rotary actuators and, more particularly, to rotary actuator lever apparatus having an annular recess.

BACKGROUND

Process control plants or systems often employ rotary valves such as, for example, ball valves, butterfly valves, eccentric-disk valves, eccentric-plug valves, etc., to control the flow of process fluids. In general, rotary valves typically include a fluid flow control member disposed in the fluid path and rotatably coupled to the body of the rotary valve via a shaft. Typically, a portion of the shaft extending from the rotary valve is operatively coupled to a stem of a rotary actuator (e.g., a pneumatic actuator, an electric actuator, a hydraulic actuator, etc.).

To couple the actuator stem to the valve shaft, a lever is typically employed. The lever converts a rectilinear displacement of the actuator stem into a rotational displacement of the valve shaft. Thus, rotation of the lever causes the valve shaft and the flow control member (e.g., a disk, a ball, etc.) to rotate to increase or restrict the flow of fluid through the valve. In operation, a positioner may be used to control the displacement of the actuator stem to rotate the lever and the valve shaft and, thus, the flow control member of the valve to a desired angular position to achieve a desired fluid flow through the rotary valve.

Typically, the lever includes a lever arm that couples to a rod end bearing of the actuator stem via a fastener. A torque applied to the fastener generates an axial load that is used to draw the lever arm into contact with the rod end bearing of the actuator stem. This load needs to be large enough to provide sufficient clamping force to prevent slippage or lost motion from occurring at the point of connection between the rod end bearing and the lever. However, failure to provide sufficient force causes slippage or lost motion to occur at the point of connection between the actuator stem and the lever, causing the control member to be improperly positioned. Such slippage or lost motion typically causes the actual position of a valve control member to deviate from a desired position. Additionally, an insufficient clamping force can cause the fastener to absorb all or most of the load applied by the actuator (via the actuator stem), which may shear or fatigue the fastener and cause failure.

Thus, a lever may be configured to receive a variety of different valve shafts such as, for example, splined shafts, double D shafts, square shafts, etc. The different valve shafts couple to the lever at different locations depending on the end style of shaft (i.e. spline, square). As a result, valve shafts having different ends transmit different torsional loads to the lever during operation. More importantly, the location of the load transmission is dependent on the end style of shaft. With known lever designs, such a variation in torsional loads can result in a sufficient clamping force for some shafts and an insufficient clamping force for other shafts.

SUMMARY

In one example, a rotary actuator lever apparatus includes a cylindrical body having a first opening and a second opening axially aligned with the first opening and sized larger than the first opening. The rotary actuator lever includes a lever arm extending a predetermined distance from the body and having a first arm member spaced from a second arm member. Each of the first and second arm members includes an aperture to receive a fastener to operatively couple the lever to a stem of an actuator. The body also has an annular recess adjacent the first arm member to enable the first arm member to flex relative to the second arm member when the lever couples to the actuator stem.

In another example, a lever includes a lever arm to be rotatably coupled to a stem of an actuator and extends a predetermined distance from a body of the lever. The body includes an annular recess adjacent the lever arm and a first opening having a first shaped inner surface to receive a first valve shaft.

In yet another example, a rotary actuator assembly includes a valve mounted to a housing and having a shaft. An actuator is operatively coupled to the valve and disposed within the housing. The rotary actuator assembly further includes a lever having a lever arm rotatably coupled to a stem of the actuator. The lever includes an annular recess adjacent the lever arm to enable a first arm member of the lever arm to flex relative to a second arm member of the lever arm when the actuator stem couples to the lever arm. The lever also includes a first opening to receive a first valve shaft.

DETAILED DESCRIPTION

In general, the example lever apparatus described herein may be used with a rotary actuator assembly and may receive different types of valve shafts such as, for example, splined shafts, square shafts, double-D shafts, keyed shafts, etc. In particular, the example lever apparatus includes a lever arm that rotatably couples the lever to an actuator stem having a rod end bearing. The lever may be loaded in different locations dependent upon the end style of the valve shaft. In particular, the lever is configured and dimensioned to withstand the maximum torsional load(s) to which it will be subjected. That is, because the lever diameter was increased to resist the torsional loading at the various locations, the increased stiffness of the lever does not permit sufficient force to clamp or couple a rod end bearing of an actuator stem to the lever arm (i.e., the rod end bearing and lever arm connection).

To reduce the lateral stiffness or increase the lateral flexibility of the lever arm, the example lever described herein includes an annular recess or groove adjacent the lever arm. The annular recess enables a fastener coupled to the lever arm to transmit a greater amount of force (i.e., a clamping force)

to a rod end bearing of an actuator stem, thereby reducing or substantially preventing slippage or lost motion from occurring at this connection and improving throttling performance of the valve. Such an annular recess is particularly advantageous for levers designed to receive and withstand torsional loading from various or multiple types of valve shafts such as, for example, splined shafts, square shafts, double-D shafts, keyed shafts, etc. As a result, the lever increases versatility of the actuator to meet international standards and enables the actuator to be coupled to a variety of different valves.

Figure 1A:
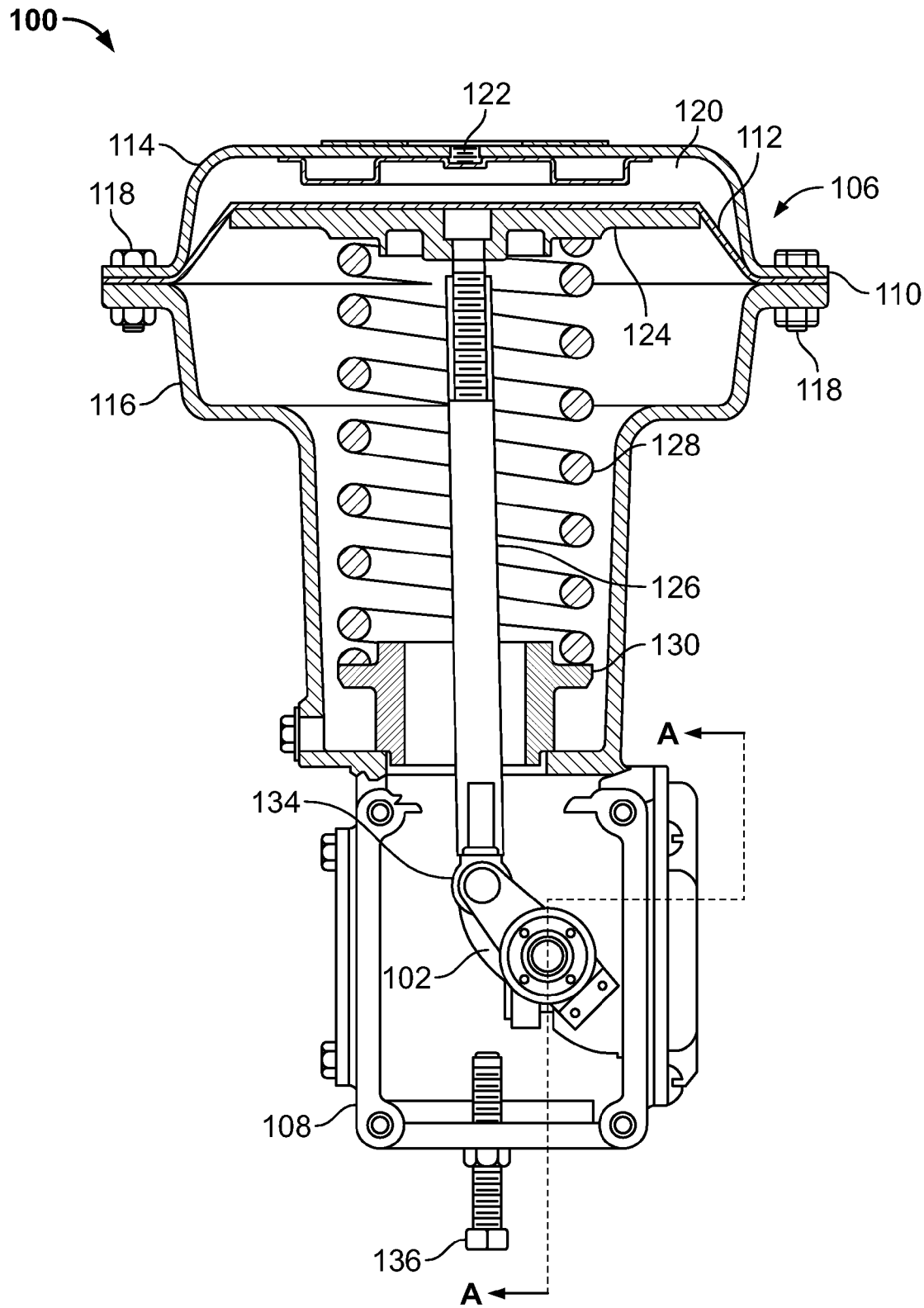
FIG. 1A is a cross-sectional illustration of a rotary actuator assembly having an example rotary actuator lever apparatus described herein.
Figure 1B:
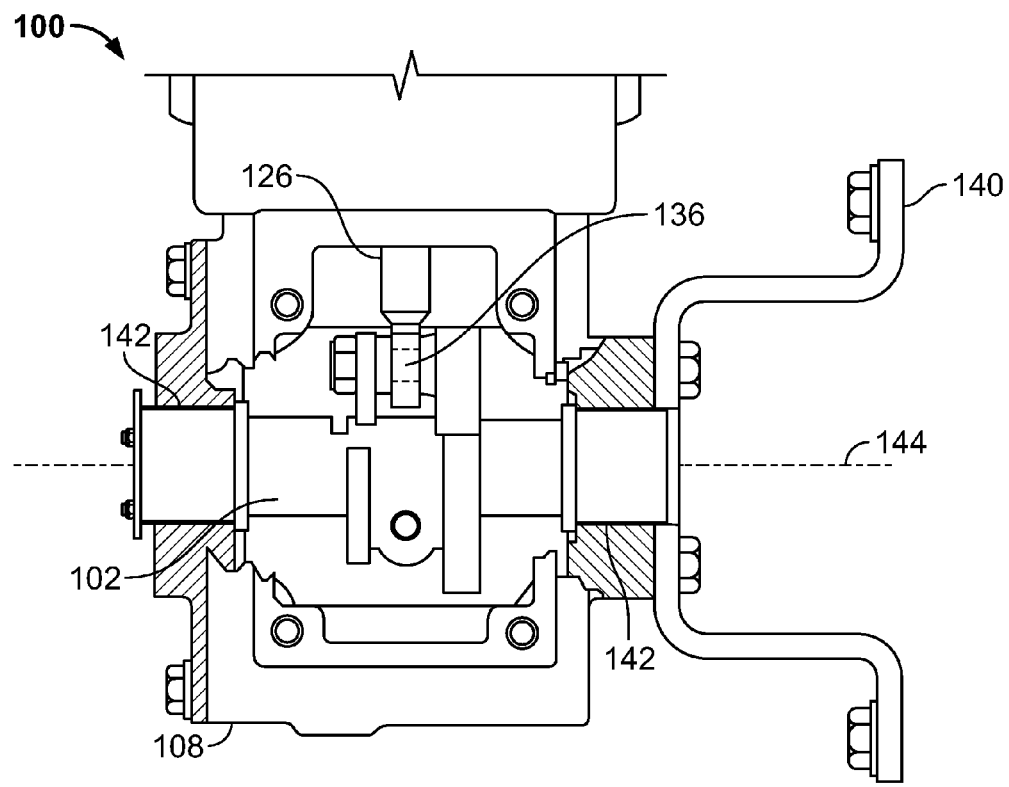
FIG. 1B is an enlarged partial cross-sectional view of the example rotary actuator assembly of FIG. 1A, as viewed along line A-A of FIG. 1A.
Figure 1C:
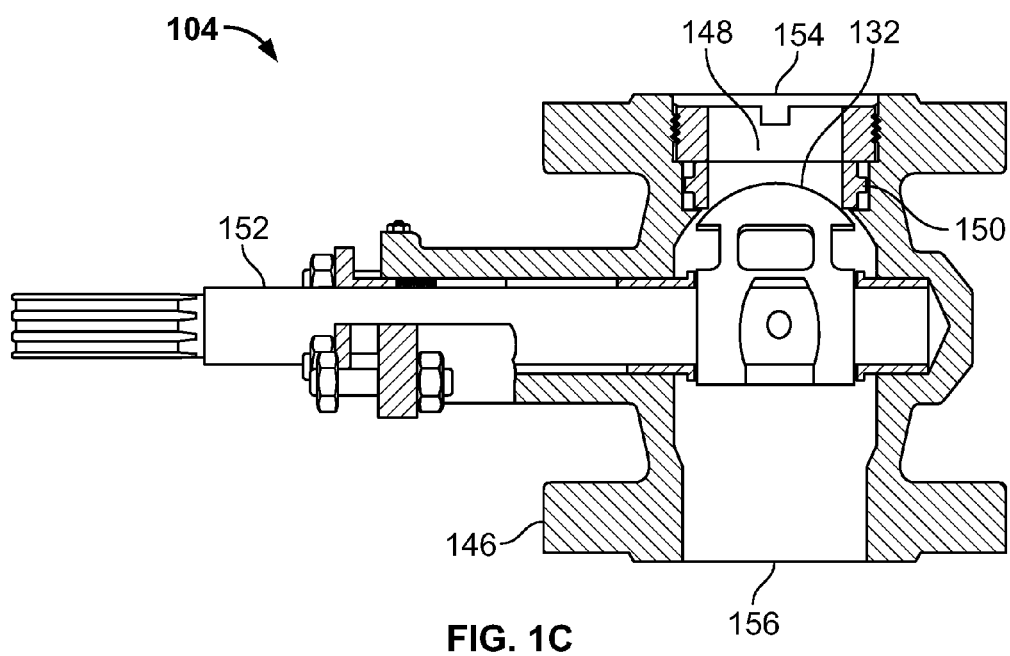
FIG. 1C is a cross-sectional view of a rotary valve that may be used to implement the rotary actuator assembly of FIG. 1A.

FIG. 1A is a cross-sectional view of an example rotary actuator assembly 100 having an example lever 102 described herein. FIG. 1B illustrates an enlarged partial cross-sectional view of a portion of the rotary actuator assembly 100 of FIG. 1A as viewed along line A-A of FIG. 1A. FIG. 1C is a cross-sectional view of an example rotary control valve 104 that may be used to implement the rotary actuator assembly 100 of FIG. 1A.

Referring in detail to FIGS. 1A, 1B and 1C, the example rotary actuator assembly 100 includes an actuator 106 (e.g., a diaphragm actuator, a piston actuator, etc.) coupled to a housing 108 of the rotary actuator assembly 100. The actuator 106 includes a casing 110 that captures a diaphragm 112 between an upper casing portion 114 and a lower casing portion 116. The casing portions 114 and 116 are coupled together with a plurality of threaded fasteners 118 spaced along an outer edge of the casing 110. The diaphragm 112 separates the space within the casing 110 into a control pressure chamber 120 through which a controlled pressure is supplied via an inlet port 122 to displace the diaphragm 112. A diaphragm plate 124 provides a rigid backing for the diaphragm 112 and couples the diaphragm 112 to an actuator stem or rod 126 (e.g., via threads). An actuator spring 128 surrounds the actuator stem 126 and is positioned between the diaphragm plate 124 and a spring seat 130. The spring 128 provides a biasing force against the diaphragm plate 124 to return the actuator stem 126 and a flow control member or throttling member 132 (e.g., a ball, a disk, a plug, etc.) of the rotary control valve 104 (FIG. 1B), or other operator coupled to the actuator stem 126, to a known position in the absence of a control pressure applied to the diaphragm 112. The actuator stem 126 includes a rod end bearing 134 to rotatably couple the actuator stem 126 to the lever 102. The housing 108 may include an adjustable stop 136 that engages the lever 102 to limit the rotational travel of the lever 102 and, thus, the rotational position of the flow control member 132.

As most clearly shown in FIG. 1B, the housing 108 includes a mounting yoke 140 that couples the rotary control valve 104 to the rotary actuator assembly 100. The actuator 106 is operatively coupled to the rotary control valve 104 via the lever 102 to operate the flow control member 132 of the rotary control valve 104. Additionally, the lever 102 is rotatably coupled to the housing 108 via bushings 142 so that the lever 102 can rotate relative to the housing 108 about an axis 144.

Referring to FIG. 1C, the rotary control valve 104 includes a valve body 146 that houses the flow control member 132 and an orifice 148 having a seating surface or seal ring 150. The flow control member 132 is coupled to a valve shaft 152 which, in turn, is coupled to the lever 102. The flow control member 132 engages the seal ring 150 to control the flow of fluid from an inlet 154, through the orifice 148, and to an outlet 156. Thus, the rate of fluid flow through the rotary control valve 104 is controlled by the position of the flow control member 132 relative to the seal ring 150. The position of the flow control member 132 may be varied from a closed position at which the flow control member 132 is in sealing engagement with the seal ring 150 to a fully open or maximum flow rate position at which the flow control member 132 is spaced from the seal ring 150.

In operation, the rotary actuator assembly 100 receives a control signal such as, for example, compressed air in the control pressure chamber 120 via the inlet port 122. The compressed air displaces the diaphragm 112 and the diaphragm plate 124 against the spring 128. The displacement of the diaphragm 112 results in a corresponding rectilinear displacement of the actuator stem 126. The rectilinear displacement of the actuator stem 126 is converted into a rotational displacement of the lever 102, whereby rotation of the lever 102 causes the valve shaft 152 and the fluid control member 132 to rotate to a desired angular position to vary or control the fluid flowing through the rotary control valve 104. When the flow control member 132 is closed, the flow control member 132 engages the seal ring 150 that encircles the flow path through the rotary control valve 104 to prevent the flow of fluid through the valve 104.

Although the rotary actuator assembly 100 of FIG. 1A is illustrated as using a pneumatic actuator (i.e., the actuator 106), the example rotary actuator assembly 100 may use any other type of actuator such as, for example, an electric actuator, a hydraulic actuator, etc. Likewise, although the flow control member 132 is illustrated as an eccentric-plug in FIG. 1C, the flow control member 132 may be implemented using any type of valve such as, for example, a butterfly valve, a ball valve, an eccentric-disk valve etc.

Figure 2A:
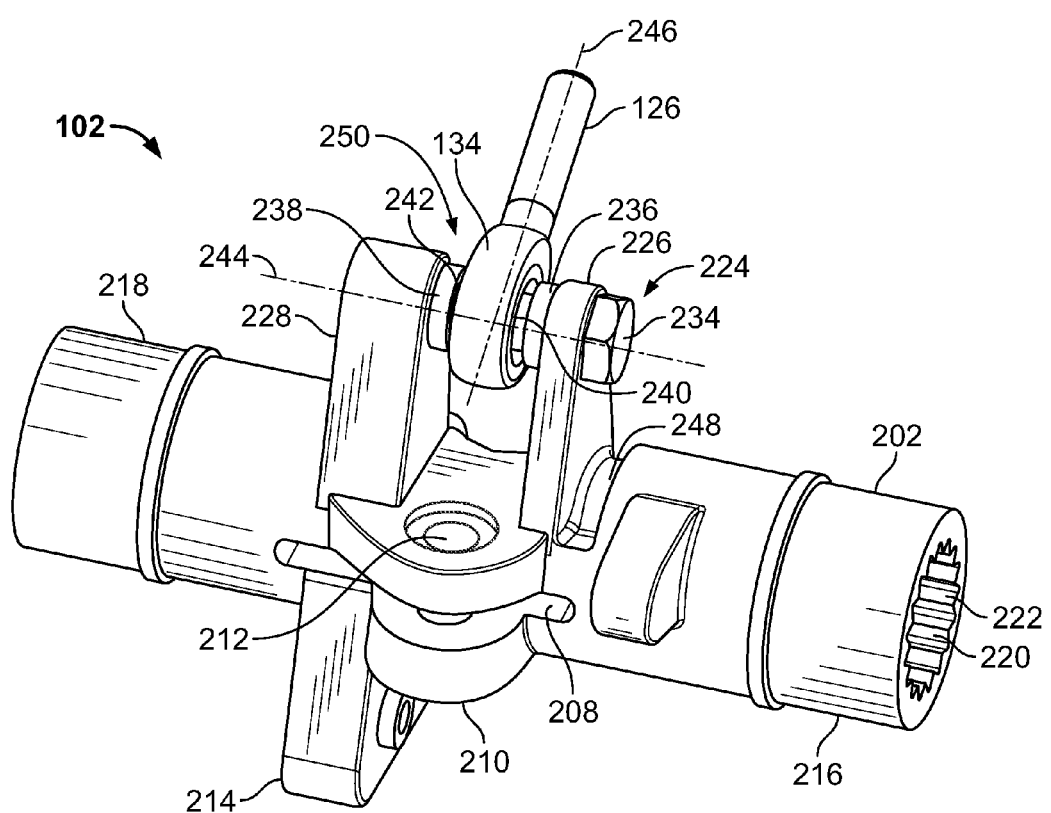
FIGS. 2A and 2B illustrate the example lever apparatus illustrated in FIGS. 1A and 1B, respectively.
Figure 2B:
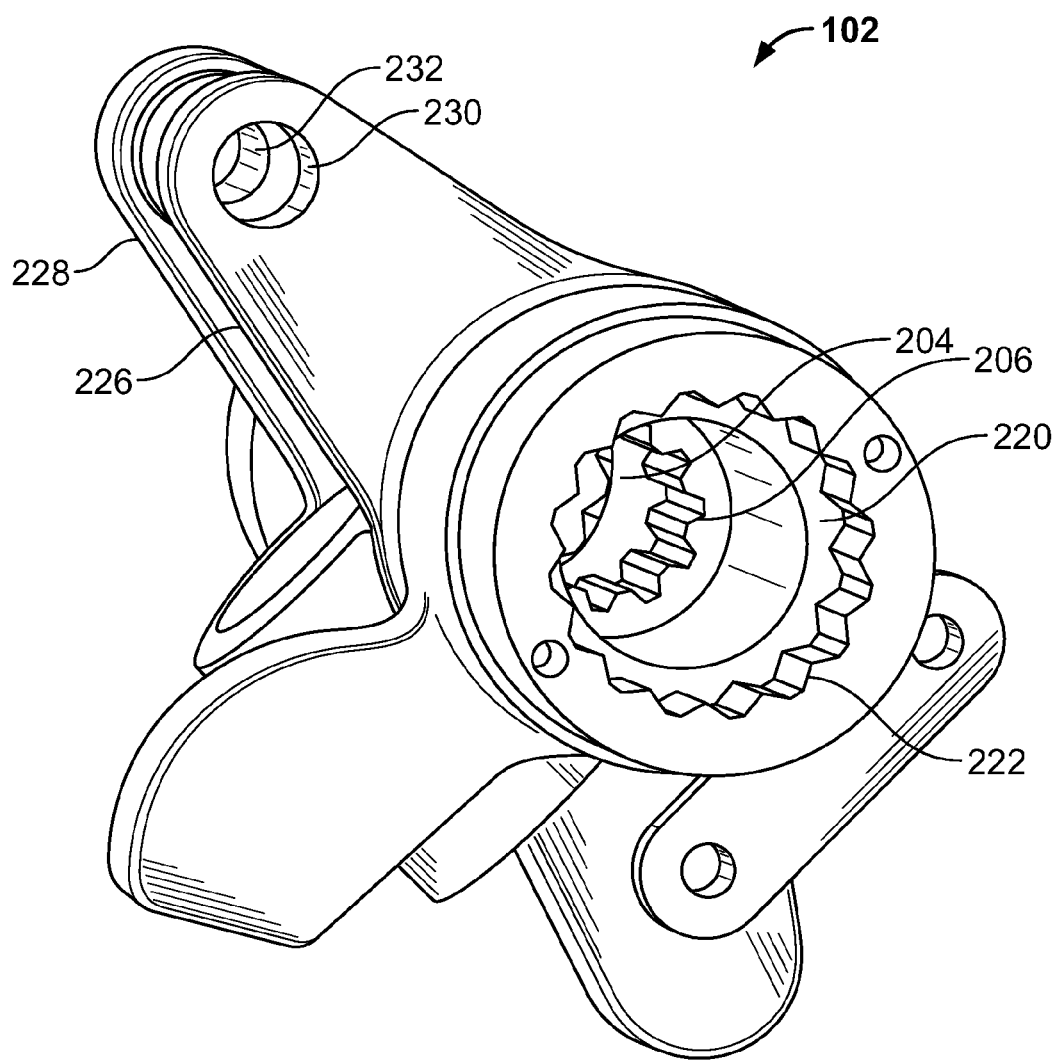

FIG. 2A and FIG. 2B illustrate the example lever 102 of FIGS. 1A and 1B. Referring to FIGS. 2A and 2B, the lever 102 includes a body 202 having an opening or aperture 204 substantially near the center of the body 202. The opening or aperture 204 includes a splined inner surface 206 to receive and/or mate with a splined valve shaft such as, for example, the valve shaft 152 depicted in FIG. 1C. The lever 102 may include a slot 208 and a clamping member 210 having an aperture 212 to receive a fastener (not shown) so that when the clamping member 210 is tightened, the lever 102 clamps to the valve shaft 152 to provide a substantially tight fit between the lever 102 and the shaft 152. Additionally, the body 202 may include a cam 214 that operatively couples to a positioner (not shown), which controls the rotary actuator assembly 100 based on the position on the cam 214.

The example lever 102 may also include a first end 216 and a second end 218. Each of the first 216 and the second 218 ends may include an opening or aperture 220 having a diameter that is larger than the diameter of the opening or aperture 204. The opening or aperture 220 includes an inner surface 222 such as, for example, a splined inner surface, to receive and/or mate with at least a portion of an insert member or shaft adaptor 306 (FIG. 3B). The insert member 306 includes an aperture (not shown) that is shaped to receive, for example, a square shaft, a double-D shaft, a keyed shaft, or may be shaped to receive any other valve shaft to couple the valve shaft to the lever 102.

The lever 102 includes a lever arm 224 that extends a predetermined distance from the body 202 and includes a first arm member 226 spaced from a second arm member 228. The second arm member 228 has a thickness greater than the thickness of the first arm member 226. The first arm member 226 also includes an aperture or mounting hole 230 and the second member 228 includes a threaded aperture or mounting hole 232 axially aligned with the first aperture 230. The apertures 230 and 232 receive a fastener 234 to rotatably couple the lever 102 to the rod end bearing 134 of the actuator stem 126. The first and second arm members 226 and 228 include hubs 236 and 238, respectively. The hubs 236 and 238 frictionally engage respective surfaces 240 and 242 of the rod end bearing 134 to prevent the rod end bearing 134 from moving along axes 244 and 246. As discussed in greater detail below, the body 202 includes an annular recess or groove 248 adjacent the first arm member 226 of the lever arm 224 to increase the amount of clamping force between the rod end bearing 134 and the lever arm 224.

The lever 102 is adapted to receive a variety of valve shaft ends (e.g., the valve shafts 302 or 304) that transmit different torsional loads at various locations on the lever. To accommodate the different torsional loads at various locations on the lever 102, the lever 102 is sized to withstand the torsional loads applied by a valve shaft, regardless of the valve shaft end or type. As a result, the lever 102 is sized to withstand the maximum torsional load(s) to which it will be subjected. In particular, the outer diameter of the body 202 is relatively larger and, thus, tends to provide more rigidity or stiffness to the lever arm 224. Additionally or alternatively, the first and second arm members 226 and 228 may also be relatively larger (e.g., thicker) to prevent the first and second arm members 226 and 228 from deflecting or bending when the actuator 106 applies a force to the lever 102. Furthermore, the second arm member 228 may engage an adjustable stop (e.g., the adjustable stop 136 of FIG. 1A) and, thus, is sized to withstand the force applied by the actuator 106 when the second arm member 228 engages the adjustable stop.

Failure to properly size the lever 102 (e.g., the outer diameter of the lever body 202) may cause the lever 102 to twist or angularly deflect when the actuator 106 applies force to rotate the lever 102. In other words, as the actuator 106 drives the actuator stem 126, the lever 102 deflects or twists before rotating a valve shaft (e.g., the valve shaft 304 of FIG. 3B) coupled to the lever 102, thereby resulting in lost motion. Additionally, if the lever 102 is improperly sized or dimensioned, shaft wind up may cause the lever 102 to angularly deflect, thereby resulting in lost motion. Shaft wind up is often caused by high seal friction between a closure member (e.g., the closure member 132 of FIG. 1C) and a valve seat (e.g., the valve seat 150 of FIG. 1C), which may be required to obtain tight shut-off. As the high friction holds the closure member in place, twisting of the valve shaft absorbs energy applied by the actuator 106 until the actuator 106 applies an amount of load that overcomes the torsional loads transmitted by the valve shaft to the lever 102, thereby causing the lever 102 to twist or angularly deflect.

An increase in the outer diameter of the body 202 and/or the first and second arm members 226 and 228 provides more rigidity and stiffness to the lever arm 224 to reduce twisting or angular deflection of the lever 102. However, an increase in lateral stiffness of the lever arm 224 tends to reduce the clamping force or load transmitted by the fastener 234 the joint formed by the lever arm 224 at the rod end bearing 134. Additionally, an increase in size of the lever 102 increases its stiffness and tends to limit the amount of clamping force that can be applied to the rod end bearing 134 from the lever arm 224. For example, if the first arm member 226 is too stiff, applying too much torque to the fastener 234 may cause the first arm member 226 to crack or fracture.

When coupled to the lever arm 224 and the rod end bearing 134, the fastener 234 transmits a clamping force to prevent backlash between a connection 250 formed by the rod end bearing 134 and the lever arm 224. Backlash causes discontinuity between the actuator 106 and the closure member 132 and occurs due to slackness or looseness between mechanical connections such as, for example, an insufficient clamping force between the lever arm 224 and rod end bearing 134 connection 250. An insufficient clamping force may cause movement along the axis 244 and/or movement along the axis 246 of travel. This translation or movement causes slippage or lost motion at the connection 250 between the rod end bearing 134 and the lever arm 224. Such slippage or lost motion can cause the control member 132 to be improperly positioned or deviate from a desired position. Additionally, an insufficient clamping force can cause the fastener 234 to absorb all or most of the load applied by the actuator 106 (via the actuator stem 126), which may shear or fatigue the fastener 234 and cause failure.

The torque applied to the fastener 234 is primarily utilized in three ways: 1) overcoming frictional forces while turning the fastener 234; 2) closing the gap between the rod end bearing and lever arm; and 3) stretching the bolt to generate the axial force used to clamp the rod end bearing to the lever. Thus, if a larger portion of the load is used to overcome fastener clamping friction or if the lever arms are too stiff, the resultant clamping force diminishes unacceptably. Thus, for a given total torque, as the frictional force component of the total torque increases, the clamping force component decreases.

More specifically, as the fastener 234 is tightened, the threaded portion (not shown) of the fastener 234 engages the threaded aperture 232 so that the arm member 226 flexes laterally to enable the hubs 236 and 238 to frictionally engage the surfaces 240 and 242 of the rod end bearing 134. As the fastener 234 is tightened, the fastener 234 is subjected to axial stresses. The axial stresses cause the fastener 234 to axially elongate, thereby producing a reactive clamping force on the rod end bearing 134 and the lever arm 224. However, the fastener 234 must overcome the torsional forces created by friction (e.g., frictional forces) between the fastener 234 and the lever arm 224 such as, for example, the frictional force the fastener 234 must overcome to laterally flex or bend the arm member 226.

As suggested above, minimizing the frictional force between the fastener 234 and the connection 250 tends to maximize the clamping force provided by the fastener 234. Lateral stiffness of the first arm member 226 is one factor contributing to the frictional forces. In other words, the stiffness of the first arm member 226 causes an increase in frictional force that the fastener 234 overcomes when connecting or coupling the rod end bearing 134 to the lever arm 224. Thus, the stiffer the lever arm 224, the greater the amount of torque that is needed to turn the fastener 234. As a result, the fastener 234 transmits less clamping force to the connection 250 because the stiffer first arm member 226 consumes more of the total torque applied to the fastener 234.

Thus, by reducing frictional force and providing flexure of the lever arm 224, an increase in the clamping force transmitted by the fastener 234 to the connection 250 for a given total torque can be realized. The body 202 includes the annular recess or groove 248 adjacent the first arm member 226 of the lever arm 224. The annular recess 248 reduces the lateral stiffness of the first member 226, thereby also reducing the frictional force that the fastener 234 must overcome to laterally flex the arm member 226 relative to the second member 228 when the rod end bearing 134 of the actuator stem 126 is coupled to the lever arm 224. As a result, for a given total torque, the fastener 234 transmits a greater amount of clamping force to the rod end bearing 134 and lever arm 224 than would otherwise be transmitted if the recess 248 was not provided. This increase in clamping force provides an improved frictional connection between the lever arm 224 and the rod end bearing 134.

The example lever 102 may be made of various materials such as ductile iron, steel, or any other suitable material and formed via any process(es) such as, for example, machining or casting etc. The splined inner surfaces 206 and 222 may be parallel keyed splines, involute splines, crown splines, serrations, etc., and may be formed via broaching, shaping, etc., or any other suitable process(es).

Figure 3A:
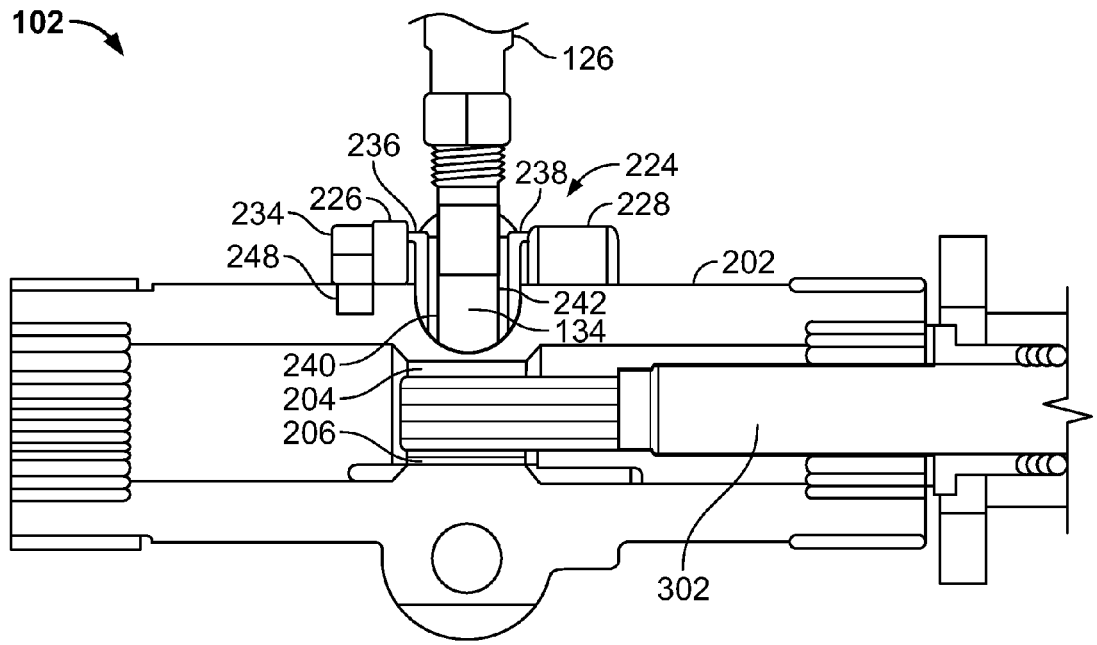
FIG. 3A is a cross-sectional view of the example lever apparatus of FIGS. 1A, 1C, 2A & 2B showing the lever coupled to a splined valve shaft.
Figure 3B:
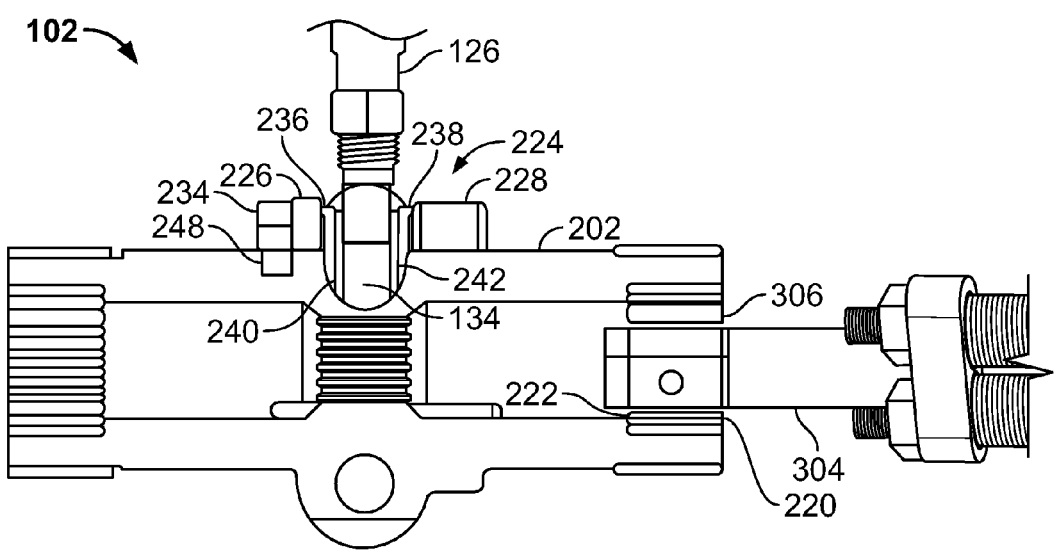
FIG. 3B is a cross-sectional view of the example lever apparatus of FIGS. 1A, 1C, 2A & 2B showing the lever coupled to a square valve shaft via an insert member.

FIG. 3A is a cross-sectional view of the example lever 102 coupled to the splined valve shaft 302 and FIG. 3B is a cross-sectional view of the example lever 102 coupled to a square end valve shaft 304 via the insert member 306. As illustrated in FIGS. 3A and 3B, the different valve shaft types 302 and 304 connect to the lever 102 at different locations. For instance, the splined valve shaft 302 engages the splined inner surface 206 of the first opening 204 (FIG. 3A) and the square valve shaft 304 couples to the lever 102 via an insert member 306 that engages the splined inner surface 222 of the opening 220 (FIG. 3B). As a result, due to the different coupling locations, the valve shafts 302 and 304 transmit different torsional loading at different locations on the lever 102 during operation. The lever 102 is sized to withstand the different (e.g., maximum) torsional loads transmitted by the valve shafts 302 and 304 to the lever 102.

Although certain apparatus have been described herein, the scope of coverage of this patent is not limited thereto. To the contrary, this patent covers all apparatus fairly falling within the scope of the appended claims either literally or under the doctrine of equivalents.

What is claimed is:

1. A rotary actuator lever apparatus, comprising:
    a cylindrical body having a first opening and a second opening axially aligned with the first opening and sized larger than the first opening; and
    a lever arm extending a predetermined distance from the body and having a first arm member spaced from a second arm member, wherein each of the first and second arm members includes an aperture to receive a fastener to operatively couple the lever to a stem of an actuator, and wherein the body has an annular recess adjacent the first arm member to enable the first arm member to flex relative to the second arm member when the lever couples to the actuator stem.

2. An apparatus as defined in claim 1, wherein the first opening is to receive a splined valve shaft.

3. An apparatus as defined in claim 1, wherein the second opening is to receive at least a portion of an insert member, and wherein the insert member includes an aperture shaped to receive a valve shaft.

4. An apparatus as defined in claim 3, wherein the aperture is shaped to receive a square shaft.

5. An apparatus as defined in claim 1, wherein the stem of the actuator includes a rod end bearing to rotatably couple the lever arm to the actuator stem.

6. A lever apparatus for use with a rotary actuator assembly, comprising:
    a lever arm to be rotatably coupled to a stem of an actuator, wherein the lever arm extends a predetermined distance from a body of the lever apparatus, wherein the body includes an annular recess adjacent a base of the lever arm proximate the body to enable the lever arm to flex relative to the body, and wherein the body includes a first opening having a first shaped inner surface to receive a first valve shaft.

7. An apparatus as defined in claim 6, wherein the first shaped inner surface comprises a splined inner surface and the first opening receives at least a portion of an insert member having a splined outer surface and an aperture shaped to receive the first valve shaft.

8. An apparatus as defined in claim 7, wherein the first valve shaft comprises a square shaft, a double-D type shaft, or a keyed connection type valve shaft.

9. An apparatus as defined in claim 6, further comprising a second opening having a second shaped inner surface to receive a second valve shaft different from the first valve shaft.

10. An apparatus as defined in claim 9, wherein the second shaped inner surface comprises a splined inner surface and the second valve shaft comprises a splined valve shaft.

11. An apparatus defined in claim 9, wherein the first opening has a larger diameter than the second opening.

12. An apparatus as defined in claim 6, wherein the stem of the actuator includes a rod end bearing to rotatably couple the lever arm to the actuator stem.

13. A rotary actuator assembly, comprising:
    a valve mounted to a housing and having a shaft;
    an actuator operatively coupled to the valve and disposed within the housing; and
    a lever having a lever arm rotatably coupled to a stem of the actuator, wherein the lever includes an annular recess adjacent the lever arm to enable a first arm member of the lever arm to flex relative to a second arm member of the lever arm when the actuator stem couples to the lever arm, and wherein the lever includes a first opening to receive a first valve shaft.

14. A rotary actuator assembly as defined in claim 13, wherein the lever further comprises a second opening to receive a splined valve shaft.

15. A rotary actuator assembly as defined in claim 13, wherein the first opening receives at least a portion of an insert member.

16. A rotary actuator assembly as defined in claim 15, wherein the insert member operatively couples the first valve shaft to the lever.

17. A rotary actuator assembly as defined in claim 16, wherein the insert member includes an aperture shaped to receive a square shaft, a double-D type shaft, or a keyed connection type shaft.

18. A rotary actuator assembly as defined in claim 13, wherein the second member of the lever arm has a thickness greater than the first member of the lever arm.

19. A rotary actuator assembly as defined in claim 13, wherein a rod end bearing rotatably couples the actuator stem to the lever arm.

20. A rotary actuator assembly as defined in claim 19, wherein a fastener couples the rod end bearing to the lever arm.

21. A lever apparatus for use with a rotary actuator assembly, comprising:
    a lever arm to be rotatably coupled to a stem of an actuator, wherein the lever arm extends a predetermined distance from a body of the lever apparatus, wherein the body includes an annular recess adjacent the lever arm, wherein the body includes a first opening having a first shaped inner surface to receive a first valve shaft, and wherein the first shaped inner surface has a splined inner surface and the first opening is to receive at least a portion of an insert member having a splined outer surface and an aperture shaped to receive the first valve shaft.

22. A lever apparatus for use with a rotary actuator assembly, comprising:
    a lever arm to be rotatably coupled to a stem of an actuator, wherein the lever arm extends a predetermined distance from a body of the lever apparatus, wherein the body includes an annular recess adjacent the lever arm, wherein the body includes a first opening having a first shaped inner surface to receive a first valve shaft and a second opening having a second shaped inner surface to receive a second valve shaft different from the first valve shaft.

* * * * *